United States Patent
Gupta et al.

(10) Patent No.: US 11,163,590 B2
(45) Date of Patent: Nov. 2, 2021

(54) GRAPHICAL USER INTERFACE COMMAND PATTERN

(71) Applicant: SAP SE, Walldorf (DE)

(72) Inventors: Sagar Gupta, Kalka (IN); Lukas Theis, Walldorf (DE)

(73) Assignee: SAP SE, Walldorf (DE)

( * ) Notice: Subject to any disclaimer, the term of this patent is extended or adjusted under 35 U.S.C. 154(b) by 26 days.

(21) Appl. No.: 16/209,217

(22) Filed: Dec. 4, 2018

(65) Prior Publication Data
US 2020/0174804 A1 Jun. 4, 2020

(51) Int. Cl.
| | | |
|---|---|---|
| *G06F 9/451* | (2018.01) | |
| *G06F 16/25* | (2019.01) | |
| *G06F 8/35* | (2018.01) | |
| *G06F 16/2453* | (2019.01) | |
| *G06F 9/448* | (2018.01) | |
| *G06F 16/248* | (2019.01) | |

(52) U.S. Cl.
CPC ............. *G06F 9/451* (2018.02); *G06F 8/35* (2013.01); *G06F 9/4494* (2018.02); *G06F 16/248* (2019.01); *G06F 16/24539* (2019.01); *G06F 16/252* (2019.01)

(58) Field of Classification Search
CPC .............................. G06F 16/152; G06F 3/011
See application file for complete search history.

(56) References Cited

U.S. PATENT DOCUMENTS

| | | | | |
|---|---|---|---|---|
| 2003/0105986 A1* | 6/2003 | Elko | .................. | G06F 11/2097 714/4.11 |
| 2004/0210663 A1* | 10/2004 | Phillips | ............... | H04L 67/1014 709/230 |
| 2004/0250032 A1* | 12/2004 | Ji | ........................ | G06F 11/2074 711/162 |
| 2007/0288551 A1* | 12/2007 | Sidon | ...................... | H04L 51/38 709/203 |
| 2009/0025017 A1* | 1/2009 | Chavan | ................. | G06F 16/958 719/329 |
| 2010/0186020 A1* | 7/2010 | Maddhirala | ........... | G06F 9/5055 718/105 |
| 2011/0052158 A1* | 3/2011 | Baker | .............. | H04N 21/41407 386/349 |
| 2011/0246518 A1* | 10/2011 | Mehrotra | ............ | H04L 67/2842 707/770 |
| 2012/0023484 A1* | 1/2012 | Demant | .................... | G06F 8/38 717/125 |
| 2012/0166977 A1* | 6/2012 | Demant | .................... | G06F 8/38 715/762 |
| 2012/0197972 A1* | 8/2012 | Tukol | ...................... | H04L 67/42 709/203 |

(Continued)

*Primary Examiner* — Rayeez R Chowdhury
(74) *Attorney, Agent, or Firm* — Erise IP, P.A.

(57) ABSTRACT

Systems, methods, and computer program products are described herein for graphical user interface command patterns. A change request to a graphical user interface is received. A discrete command is generated based on the change request. The change request is temporarily rendered on the graphical user interface using the discrete command to retrieve local data. In parallel with the temporary rendering, backend data is retrieved in response to the discrete command. An update to the graphical user interface is rendered based on an existence of a delta between the local data and the backend data.

17 Claims, 8 Drawing Sheets

(56) References Cited

U.S. PATENT DOCUMENTS

| | | | | |
|---|---|---|---|---|
| 2013/0110906 A1* | 5/2013 | Zearing | ............... | G06F 16/9574 |
| | | | | 709/203 |
| 2013/0170482 A1* | 7/2013 | Jung | ................... | H04W 8/005 |
| | | | | 370/338 |
| 2013/0326015 A1* | 12/2013 | Robertson | ............... | G06F 16/25 |
| | | | | 709/217 |
| 2014/0215434 A1* | 7/2014 | Kaneko | ................... | G06F 8/34 |
| | | | | 717/109 |
| 2014/0279581 A1* | 9/2014 | Devereaux | .............. | G06F 9/455 |
| | | | | 705/310 |
| 2014/0371979 A1* | 12/2014 | Drew | .................... | G07C 5/008 |
| | | | | 701/32.3 |
| 2015/0251095 A1* | 9/2015 | Perrin | ................... | G06T 15/005 |
| | | | | 463/31 |

* cited by examiner

GRAPHICAL USER INTERFACE COMMAND PATTERN

TECHNICAL FIELD

The subject matter described herein relates to enhanced techniques for locally processing graphical user interface changes using a command pattern.

BACKGROUND

Application development has become essential for the Information Technology (IT) industry. Applications were used primarily to provide a graphical view of data stored in backend systems, and computer logic execution or any form of data manipulation was programmed in the backend systems. Applications were treated as dummy client interfaces because client machines were not proficient in performing complex computational operations or executing operations such as data manipulation and/or analysis. As client machines become more advanced and capable of performing complicated operations, application developers can make client interfaces more intelligent. Enabling client interfaces to handle such complex business processes can be of importance for some scenarios, such as in collaborative user interface designing where data representation and data insertion are not the sole purpose of the applications.

A user's choice of data representation increases the data transfer volume between the user's device and the backend server. This volume can cause an inability in the client-side logic to handle complex computations and data analysis tasks. Dependency on a backend system can degrade the usability of the web application as each round trip to the backend system can result in latency. Data retrieval from the backend system can occur synchronously, which can affect a total load time of a user interface as it is the sum of the time taken by each backend request. This data fetching operation can increase an overall response time of web applications. The round trip between the client workstation and the backend system can restrict the user from performing any actions in the user interface until the data loads completely.

SUMMARY

In one aspect, a change request to a graphical user interface is received. A discrete command is generated based on the change request. The change request is temporarily rendered on the graphical user interface using the discrete command to retrieve local data. In parallel with the temporary rendering, backend data is retrieved in response to the discrete command. An update to the graphical user interface is rendered based on an existence of a delta between the local data and the backend data.

In some variations, the change request can be a data query. Retrieving backend data can include determining if temporary data in response to the data query is cached in a local data model. The data query can be provided to a backend. The backend data can be received from the backend in response to the data query.

In other variations, generating the discrete command can include generating a class representing the change request. An instance of the class can be generated for further handling by a command processor.

In some variations, retrieving the backend data can include providing the discrete command to a backend. The backend data can be received from the backend in response to the discrete command.

In other variations, whether the backend data is responsive to the change request can be determined. The backend data can be parsed. The existence of the delta between the backend data and the local data can be determined. Based on the existence of the delta, the update can be rendered to the graphical user interface.

In some variations, the update to the graphical user interface can include retaining the temporarily rendered change request based on the delta between the backend data and the local data being non-existent.

In other variations, the discrete command can be added to or removed from an undo stack for handling of a further change request. The change request can be to undo or redo a prior change request and the temporary rendering of the change request can include retrieving the command from the undo stack.

In some variations, the change request can be derived from user input via the graphical user interface.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter can reduce the burden on the backend systems when performing a variety of business operations. The subject matter described herein can also provide flexibility to the developers by converting user actions executed in the user interface into simple, discrete commands. A user can then submit these commands individually in an asynchronous manner to the backend system for processing. Handling user actions through individual commands in an asynchronous manner makes the user interface non-blocking. This also provides flexibility in performing some of the user interface changes to a user interface locally while awaiting a response from the backend.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

High frequency user interaction with an application can introduce data latency due to communication between the application and a backend network. For example, an application that facilitates document assembly or editing can experience high volumes of user input. Even more input can occur if a number of users are assembling or editing the same document at the same time. The subject matter herein provides a command pattern framework which addresses communication between a user interface (UI) application and a backend during receipt of frequent user interaction. The command pattern framework can convert user change requests made to a UI into discrete commands (e.g., modify/move an object on the UI, request data through the UI). The discrete commands can be added to an internal queue for processing. The UI changes can temporarily be applied locally to the UI so that a user can continue working on the UI without interruptions. Once a response is received from the backend, the command process framework can validate whether the local UI state is accurate or if it needs to be updated based on the backend information. If the UI state needs to be updated, the changes can be merged with the local UI state to update the UI according to the backend state. The response of the command can intelligently trigger other read or data fetching operations to make the UI state more accurate in real time, while preserving valuable data processing resources. Network traffic and server loads can be reduced using this command pattern framework as data can be intelligently cached to avoid network calls. In the implementation of commands, error states can be monitored. Error states that can result from various backend issues and/or subsequent commands which are either dependent commands or reverting the changes made in the command can be skipped or adjusted so that the commands failure rate can be reduced, and applications can be more resilient.

Additionally, the query framework can fetch application level master data during the load time asynchronously which will be available as a global model through the user interface. This can avoid multiple calls to backend to fetch data which is static.

The command pattern architecture as described herein can obviate mutually dependent requests and provide seamless data flow between a UI and backend systems. With the command pattern architecture, a user's actions can include discrete commands which are sent to a backend system for processing. The backend can return backend data which includes, for example, different types of information packets. The information packets can include the following types: i. success, ii. error, or iii. completion. Each of these types of information packets can represent a form of data. After receiving the backend data, the command pattern can decide how the UI state should respond to it.

Use of the subject matter described herein can help reduce the amount of data traffic between the UI and backend systems. Changes in the UI can be handled in a non-blocking manner without waiting for a backend response. Applying non-critical UI changes locally without waiting for the backend response can enhance the user experience and provide a collaborative working environment to users. The discussed solution also reduces the chances of deadlock situations.

Figure 1:
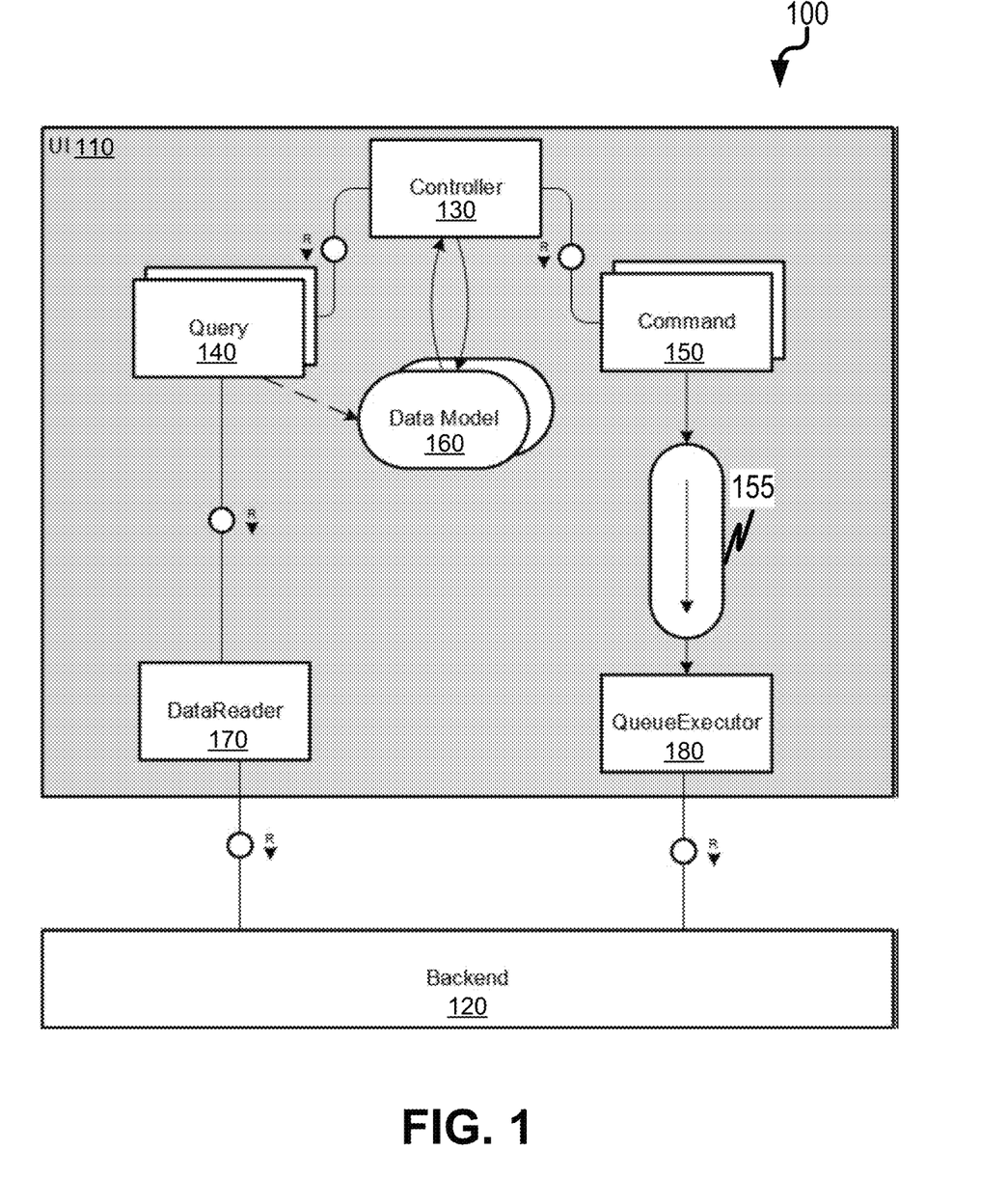
FIG. 1 is a block diagram illustrating an example command pattern architecture.

FIG. 1 is a block diagram illustrating an example command pattern architecture 100. Within command pattern architecture 100, a UI 110 can interface with a backend 120. UI 110 can include a controller 130, a query processor 140, a command processor 150, an internal queue 155, a data model 160, a data reader 170, and a queue executor 180. Backend 120 can include a number of external components and configurations such as those illustrated and described in FIG. 7.

Controller 130 can act as a central processing unit (CPU) for command pattern architecture 100. Controller 130 can monitor change requests to the UI 110 made by the user. Based on the user's change requests to the UI 110, controller 130 can determine if the action requires backend processing or a data reload. Controller 130 can either pass the request to the command processor 150 or query processor 140 for backend execution based on the type of change request (e.g., one which requires a command to be generated or one which requires a query). When controller 130 receives backend data from the backend 120 in the form of a response, controller 130 can verify a response state. The response state can include a determination if the data is success data, error data, or a completion flag. Additionally, the backend data can be compared to local data stored within data model 160. If the local data and the backend data are the same, no further UI 110 updates are required. After identifying the response state, controller 130 can initiate data parsing of the backend data to update the data model 160.

Command processor 150 can manage the execution of user commands provided through UI 110. When a user requests a change to the UI 110, controller 130 can observe this change. Depending on the nature of the change, data change commands may result. For example, if a user requests to move an object displayed on the UI 110, a command is generated to represent this move request. Once the command is generated, command processor 150 can receive the command from the controller 130. The command can be stored within a queue of commands 155 for processing. The queue of commands can be scanned by the queue executor 180. Queue executor 180 can provide the command to the backend 120.

Once the command processor 150 receives the response to the command from the backend 120 (e.g., backend data), the response is sent to controller 130, which updates the data model 160 accordingly. The data model 160 can act as a primary cache for the UI state of the UI 110. The controller 130 can limit the change to the specific element rather than re-rendering the UI 110.

If the command results in failure, the controller 130 can inform the user via rendering a notification on the UI 110. If the user agrees to cancel further processing of the change, the UI changes made for that request can be reverted. For example, if the user changes his/her profile picture and due to some issue, the request results in a failure, the controller 130 can notify the user of the failure to reload. If the user agrees to retry the same command, the command can be registered again in the command queue 155. In another example, if the user wants to cancel the changes, the controller 130 can revert the changes based on the old state present in the data model 160.

Use of command pattern architecture 100 can keep a state of UI 110 in sync with the backend 120. The query executor module 140 can perform an update to the data model 160 whenever a state change is required or if the UI 110 requires a complete refresh of the data to sync with backend data 120. For example, if the local data differs from the backend data, the backend data can supersede the local data, triggering an update to UI 110. This update can be performed by either merging the local data with the backend data or replacing the local data stored in data model 160 with the backend data.

The query processor module 140 can also reload granular-level information from a change require that requires a query. For example, if the user wants to reload only information about work experience from the backend 120, the query processor module 140 can reload the data from the backend system 120 and modify the data model 160 with the latest information.

Like the queue executor 180 which submits the command to the backend 120, the data reader 170 can perform a similar job for the query processor module 140 in submitting a query. A user can submit a request to reload data from the backend 120 multiple times. Instead of querying the backend system 120 repeatedly for repeated reload data request, the query processor module 140 can first verify if similar data is present in the data model 160 before reaching out to the backend 120. This technique of data fetching can save multiple queries to the backend 120 to load the same data, which in turn can saving processing time and resources.

Figure 2:
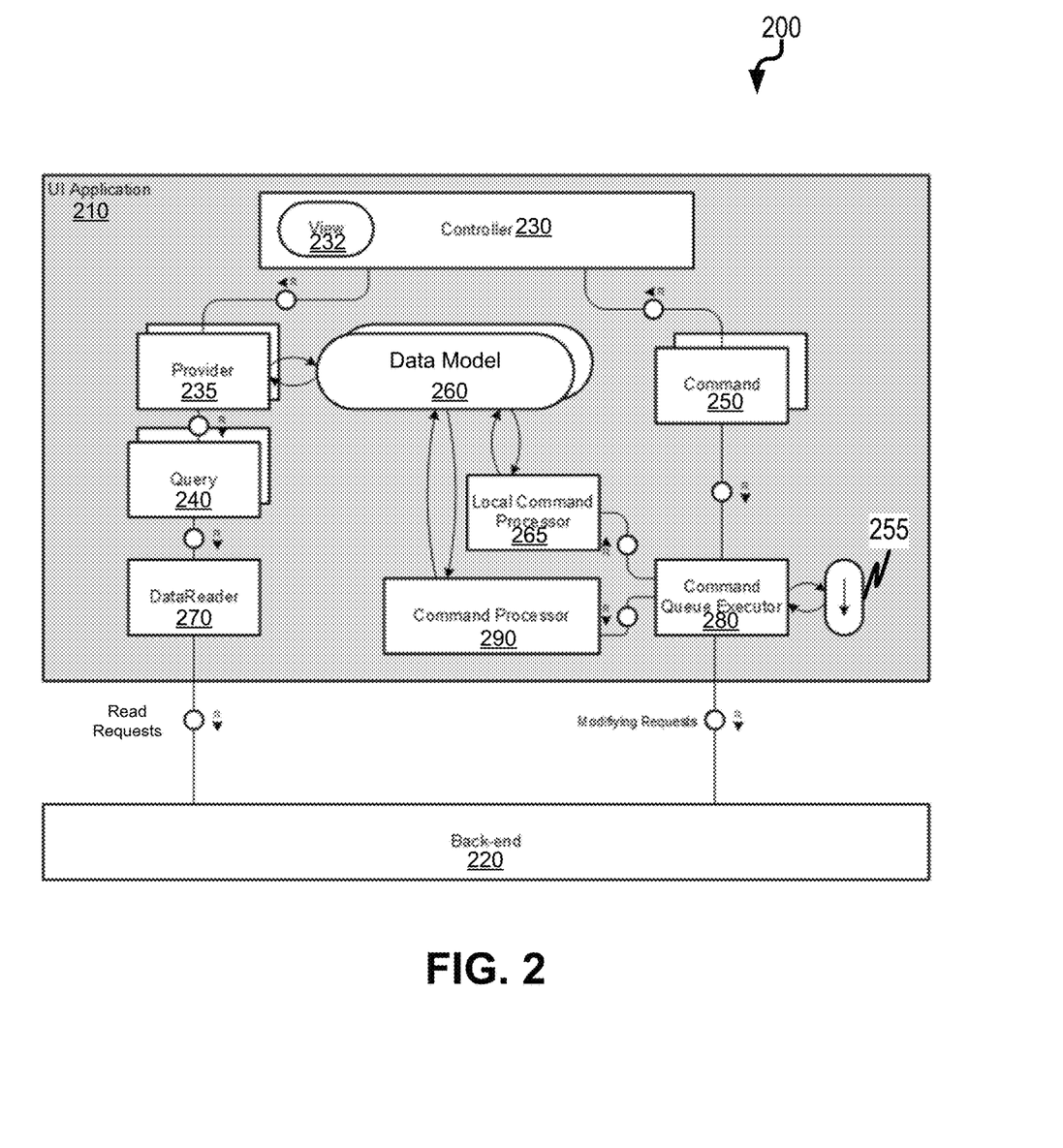
FIG. 2 is a block diagram illustrating another example command pattern architecture.

FIG. 2 is a block diagram illustrating another example command pattern architecture 200. UI 210 can communicate with backend 220 to facilitate processing changes to UI 210. UI 210 can include a controller 230, provider 235, query processor 240, command instances 250, data model 260, local command processor 265, data reader 270, command queue executor 280, and command processor 290. Controller 230 can control how to visualize the data shown to a user (e.g., within view 232). A data model 260 can store data objects locally within UI 210. For each interaction with the UI 210, a class can be created that represents a particular change. An instance of the class can be generated into a command so that the change request is mapped with the at least one of the command instances 250. Once a command is generated and received by command queue executor 280, the command can be stored in an internal queue 255. Each command can be stored in an internal queue 255. Internal queue 255 can be used by command queue executor 280 to choose which command to process. Local command processor 265 can receive a command and perform changes locally on UI 210 based on the change request. As a result, the view 232 (e.g., visualization of the change request to the user) can be modified by the provider 235 to temporarily update the UI 210.

In parallel to the temporary UI 210 update, the command queue executor 280, using the command processor 290, can send the command to backend 220 for further processing. The command processor 290 can await a response from the backend 220. While the command processor 290 is waiting, the rest of the UI 210 can continue to operate and no delay in the processed change can be detectable by a user via view 232. Once a response is received from the backend 220 (e.g., backend data), command processor 290 can determine whether a delta exists between the backend data and the local data. A delta can exist, for example, if the backend data does not match the local data. In other words, the backend data and the local data are not identical. The command processor 290 can provide any delta between the backend data and the local data to data model 260, if necessary. If there is no existence of a delta between the backend data and the local data, the UI view 232 is not further updated and the temporary changes previously made to the UI 210 can be retained. If there is changed data from the backend 220, then the UI view 232 is updated accordingly via provider 235. In some variations, the UI view 232 can be updated by the merging of the backend data with the local data. In other variations, the UI view 232 can be updated by replacing the local data with the backend data.

Provider 235 can also be an access point for the controller 230 to access queries 240 and/or data stored within data model 260. Provider 235 can streamline a way for controller 230 to access data. Query processor 240 can send a query request from provider 235 to data reader 270. Data reader 270 can determine whether the information related to the query request is cached or if it is cacheable. The cached information (e.g., stored in data model 260) can be used to give a response (e.g., local data) to provider 235 without first sending the query to the backend 220. In some cases, the query information may not cached or if the cache is expired, the query can be sent to the backend 220 in parallel with the local update to the UI 210 (e.g., via view 232). Once the backend 220 provides a response (e.g., backend data) to data reader 270 it can be provided to the provider 235 and the data model 260. In turn, provider 235 can update the UI view 232 for the user if there is a delta between the backend data and the local data as previously described in FIG. 1. The architecture described in FIGS. 1-2 can be applied to any application using any modern UI framework (e.g., AngularJs, ReactJs, jQuery or SAP UI5).

Figure 3:
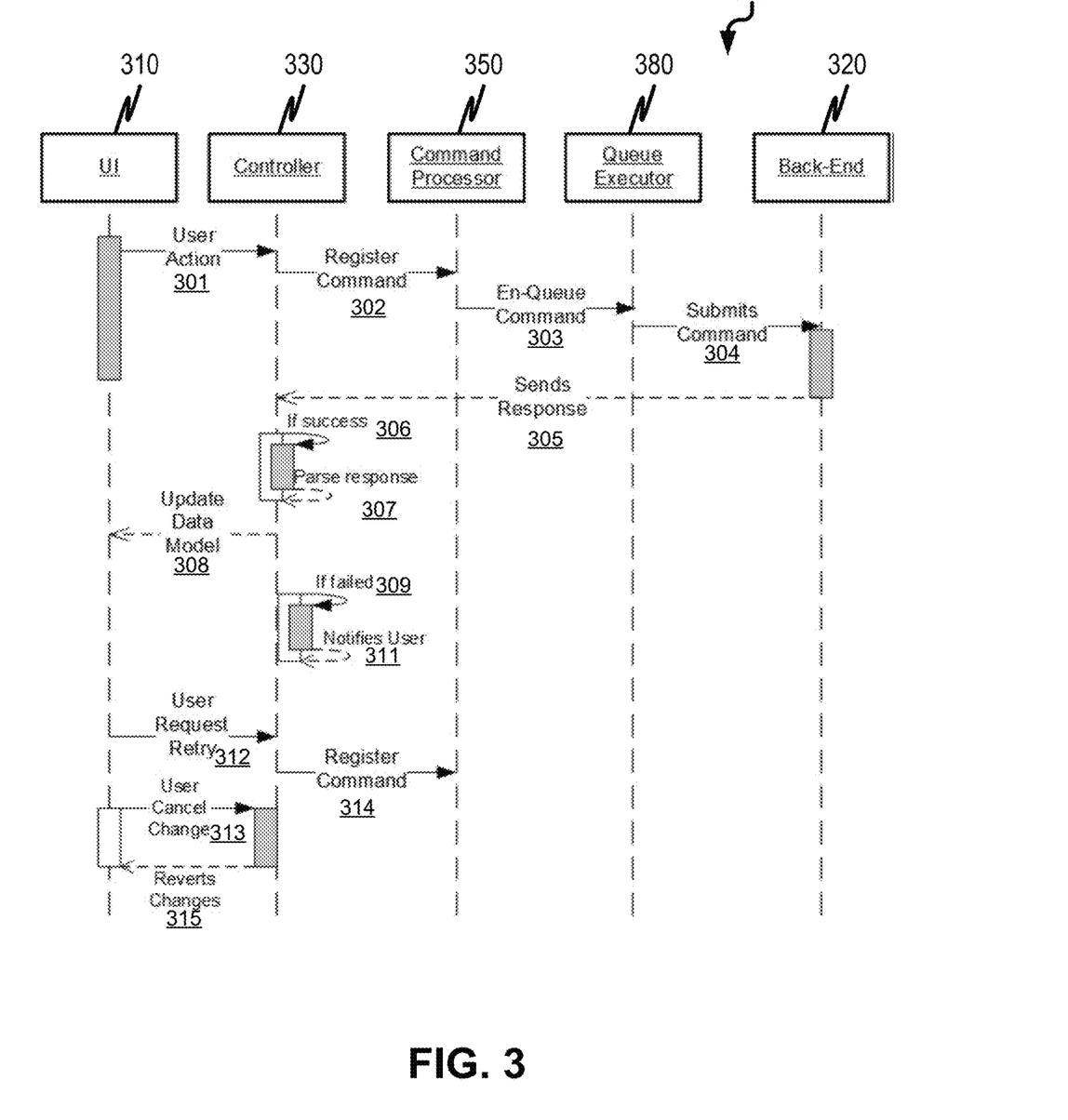
FIG. 3 is a sequence diagram illustrating an example sequence flow for a change request requiring command generation in accordance with FIG. 1.

FIG. 3 is a sequence diagram illustrating an example sequence flow 300 for a change request requiring command generation in accordance with FIG. 1. When the controller 330 receives a user action, at 301, such as a change in UI 310, controller 330 can determine what the type of change request was made (e.g., a change request requiring command generation or a query). For example, controller 330 can determine if the change to the UI 310 requires a data update or if the controller 330 needs only a refresh of data. If the change request needs backend 320 processing, then the controller 330 can determine which part or sub-part of the current UI 310 state should form the backend request to backend 320. Once the user change request (e.g., data change to the UI element) is recorded by controller 330, the controller 330 can register the UI request with the command processor 350, at 302. The data change can then be appended to the payload of the generated command that is bound for handling data changes of that UI element. Once the command is generated with command processor 350, the command processor 350 provides the command to the queue executor 380 for processing, at 303. Queue executor 380 can store the command within an internal queue and submit the command to backend 320 for processing.

Backend 320 can send a response (e.g., backend data) to the command, at 305, back to controller 330. After obtaining a response from the backend 320, the controller 330 can assess the state of response before parsing the response. Controller 330 can check the status code set by the backend 320 to highlight the result. The status codes can be codes such as HTTP codes or some pre-configured values that convey the result of the execution in the backend 320, such as success, failure, or bad request. If the response code is evaluated by controller 330 to be success, at 306, the response from backend 320 can be parsed by the controller 307. After parsing, the response (e.g., backend data) can be compared with the local data and registered in the data model, at 308. If the request results in failure, after being evaluated, at 309, the controller 330 can notify the user of the failure, at 311, via the UI 310. Controller 330 can also provide an option to either retry the action or cancel the changes. If the user wishes to cancel the action, via input to UI 310, at 313, the controller 330 can revert the local changes made to the UI 310, by reverting to an old state stored in the data model, at 315. If the user wishes to retry a change, at 312, the user action again is sent to command processor 350 via controller 330, at 314, and subsequently the command is sent back to the command queue executor 380 for reprocessing using the steps as previously described.

Figure 4:
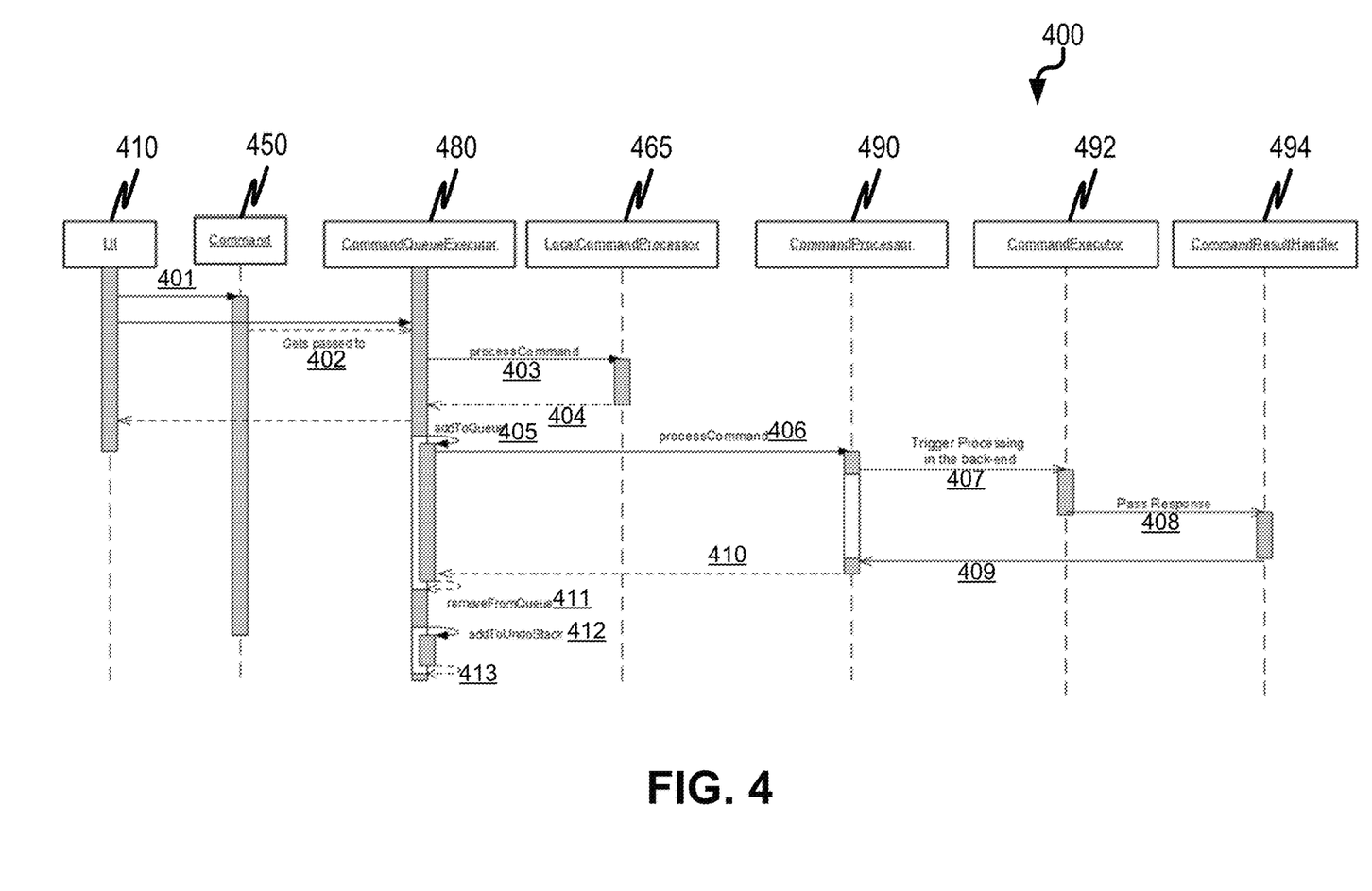
FIG. 4 is a sequence diagram illustrating an example sequence flow for a change request requiring command generation in accordance with FIG. 2.

FIG. 4 is a sequence diagram illustrating an example sequence flow 400 for a change request requiring command generation in accordance with FIG. 2. A user can request a change to UI 410. The user request can be mapped, at 401, to command instances 450. Once a command instance is generated and mapped, the command can be added to its internal queue to await processing. Internal queue can be used by command queue executor 480 to choose which command to process, at 403. The processed command from local command processor 465 can be returned to command queue executor, at 404. Command queue executor 480 can add the command to its internal queue, at 405. In parallel with an update to the UI 410, at 414, the command can then be sent to command processor 490, at 406, for processing to send off to backend (not shown in FIG. 4). Command processor 490 can trigger processing of the command in the backend (not shown) by sending the command to command executor 492, at 407. Command executor 492 can pass a response, at 408, from backend to command result handler 494. Command result handler 494 then provides back the response to command processor 490, at 409. Command processor 490 can provide the response to command queue executor 480, at 410, for removal from the queue, at 411. The command can then be added to an undo stack, at 412, to preserve data within data model 260 should the user attempt to revert the last change or a previous change. When the user triggers an undo action, via input to UI 410, the reverse command of last processed command can be executed to revert the changes and the same gets added to the "redo-stack". In case of redo action, the original command can be processed again, at 413.

Figure 5:
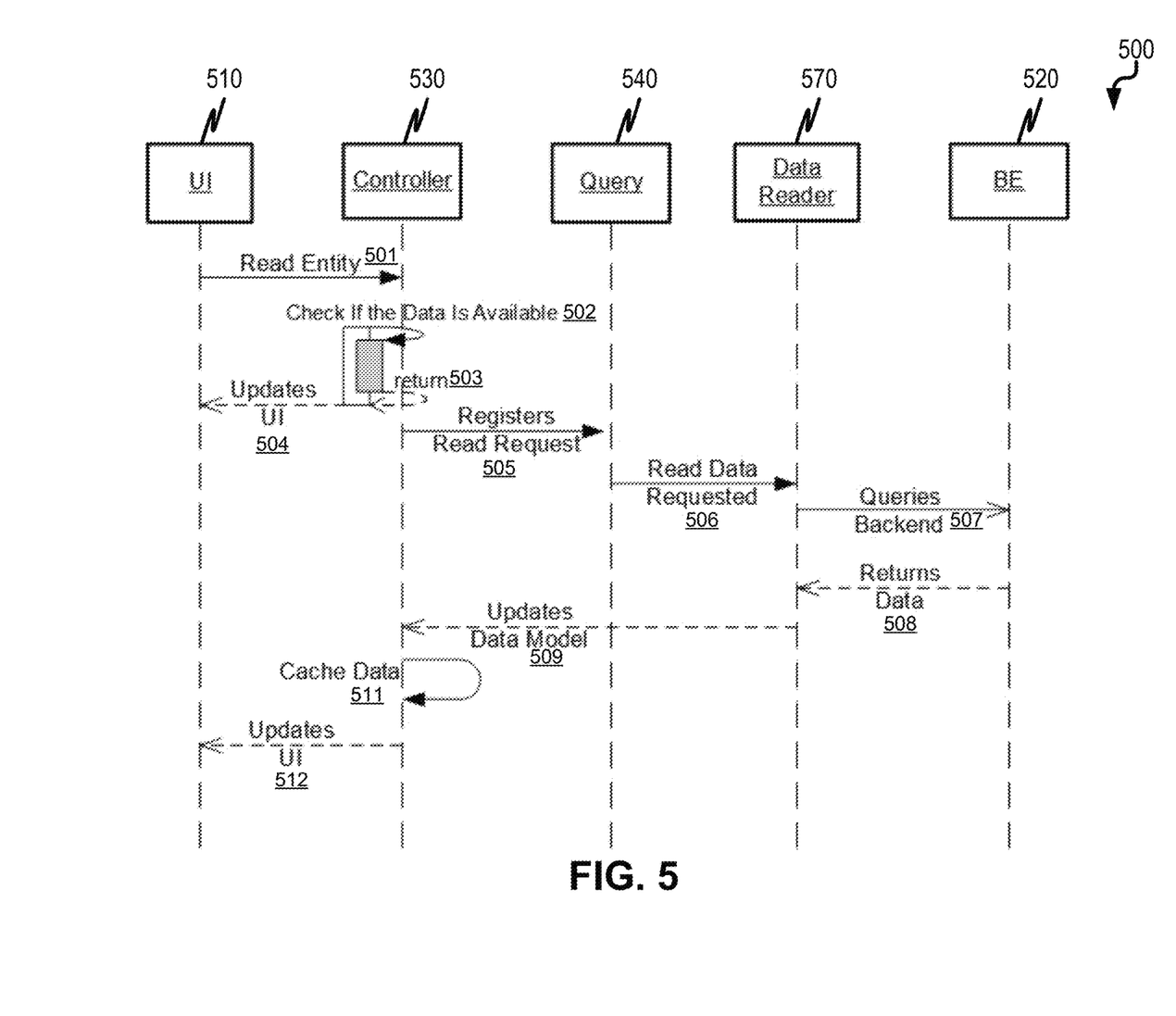
FIG. 5 is a sequence diagram illustrating an example sequence flow for a change request requiring a query in accordance with FIG. 1.

FIG. 5 is a sequence diagram illustrating an example sequence flow 500 for a change request requiring a query in accordance with FIG. 1. UI 510 can request to reload data from the backend 520. For example, a user can request to reload a profile picture when it has not been rendered properly in the UI 410. If controller 530 determines that the user action from 501 requires a data refresh from the backend 520 rather than new data, the controller 530 can send the request to the query executor 540 to reload the specific information from the backend 520. More specifically, the UI 510 change request can indicate a data reload, at 501. Controller 530 can check to see if the data is available, at 502, in data model 160. If the data is available, as indicated by return 503, controller 530 can facilitate updating the UI 510 using the local data. If the data is not available, controller 530 can register a read request with query executor 540, at 505. Query executor 540 can try to respond first with the locally cached data from data model 160 by sending a read data request to data reader 570, at 506. Data reader 570 can submit a new request, at 507, to the backend 520 for supplying the requested data. Backend 520 can return this data back to data reader 570, at 508. Data reader can provide this data from backend 520 to controller 530, at 509, for analysis by controller 530 before rendering the data in the UI 510. Query processor 540 can also store a local copy of the data in the data model 160 for future reference. Controller 530 can cache the data, at 511, and update the UI accordingly, at 512.

Figure 6:
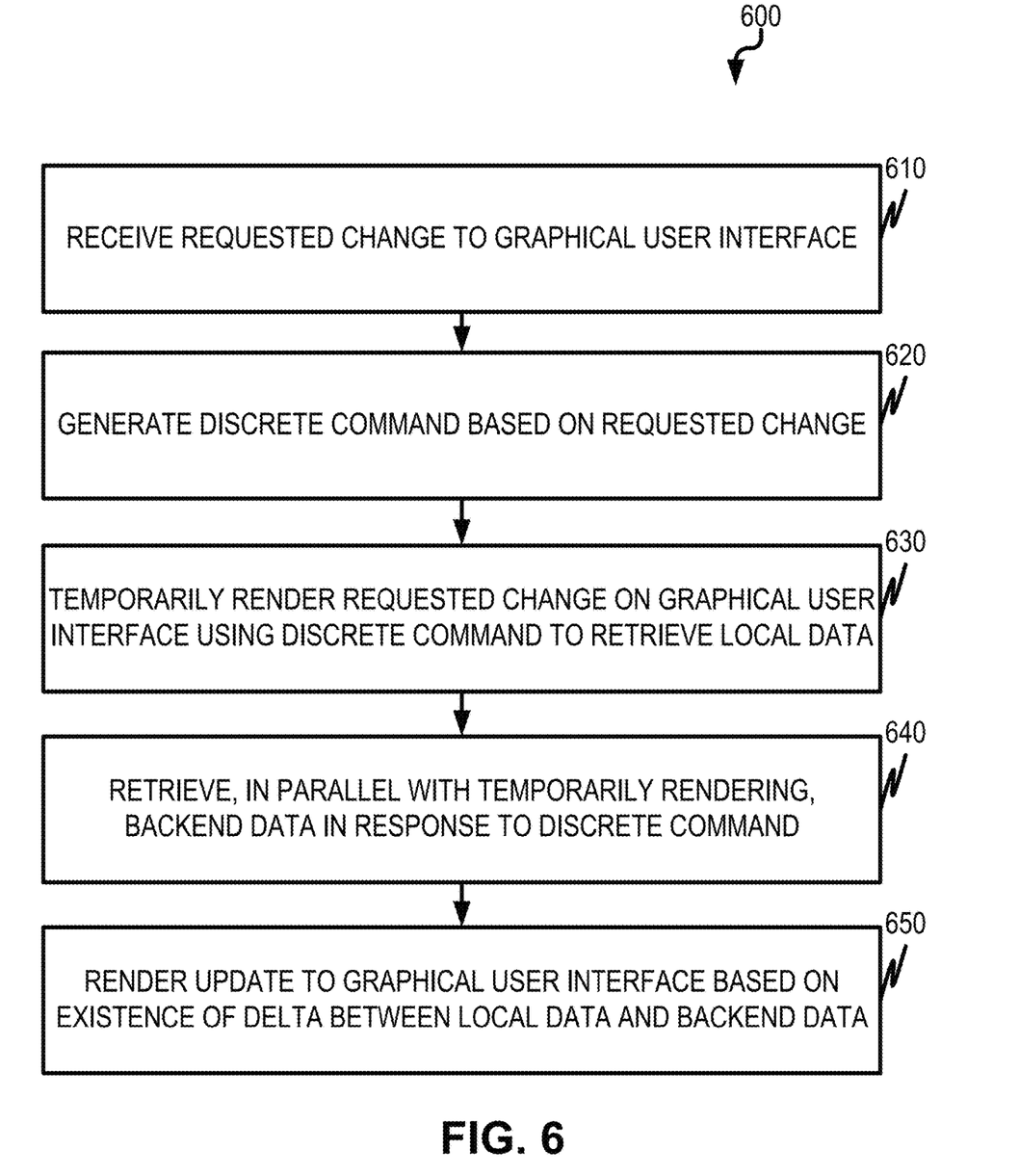
FIG. 6 is a process flow diagram illustrating example processing of a user action using a command pattern.

FIG. 6 is a process flow diagram 600 illustrating example processing of a user action using a command pattern. A change request to a graphical user interface is received, at 610, via user input to the graphical user interface. A discrete command is generated, at 620, based on the change request. The change request is temporarily rendered, at 630, on the graphical user interface using the discrete command to retrieve local data. In parallel with the temporarily rendering, backend data is retrieved, at 640, in response to the discrete command. An update to the graphical user interface is rendered, at 650, based on an existence of a delta between the local data and the backend data. If there is no difference between the local data and the backend data, the temporarily rendered state of the graphical user interface is retained until the next user action is received to request another change to the graphical user interface.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random access memory associated with one or more physical processor cores.

Figure 7:
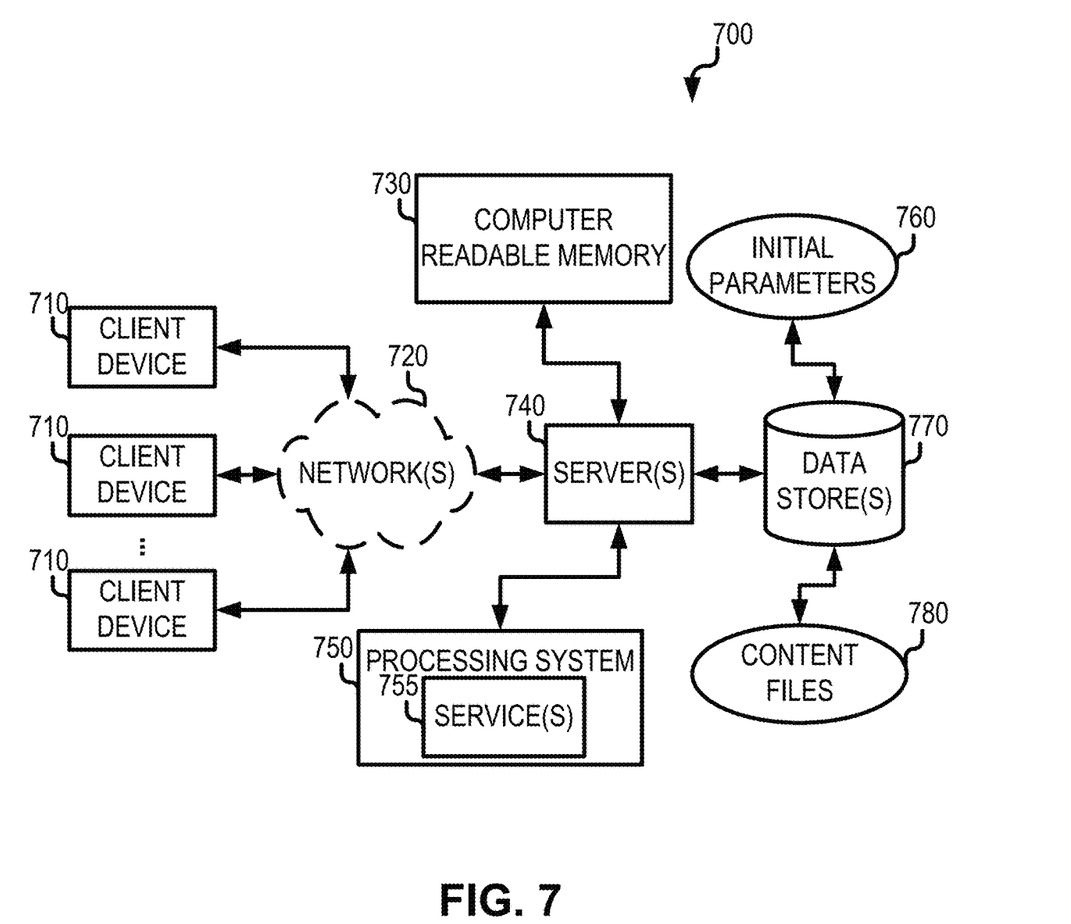
FIG. 7 is a diagram illustrating an example implementation system of a client-server architecture for use in connection with the current subject matter.

FIG. 7 is a diagram illustrating an example implementation system 700 of a client-server architecture for use in connection with the current subject matter. One or more client devices 710 access one or more servers 740 running one or more services 755 on a processing system 750 via one or more networks 720. For example, UI 110, 210, 310, 410, 510 can be visualized to a user via a client device 710 with backend 120, 220, 320, 520 being server 740 or other components coupled thereto. Alternatively, client device 710 and server 740 can be the same computing device eliminating the need for network 720. One or more servers 740 can access computer-readable memory 730 as well as one or more data stores 770. One or more data stores 770 can include initial parameters 760 as well as content files 780.

Figure 8:
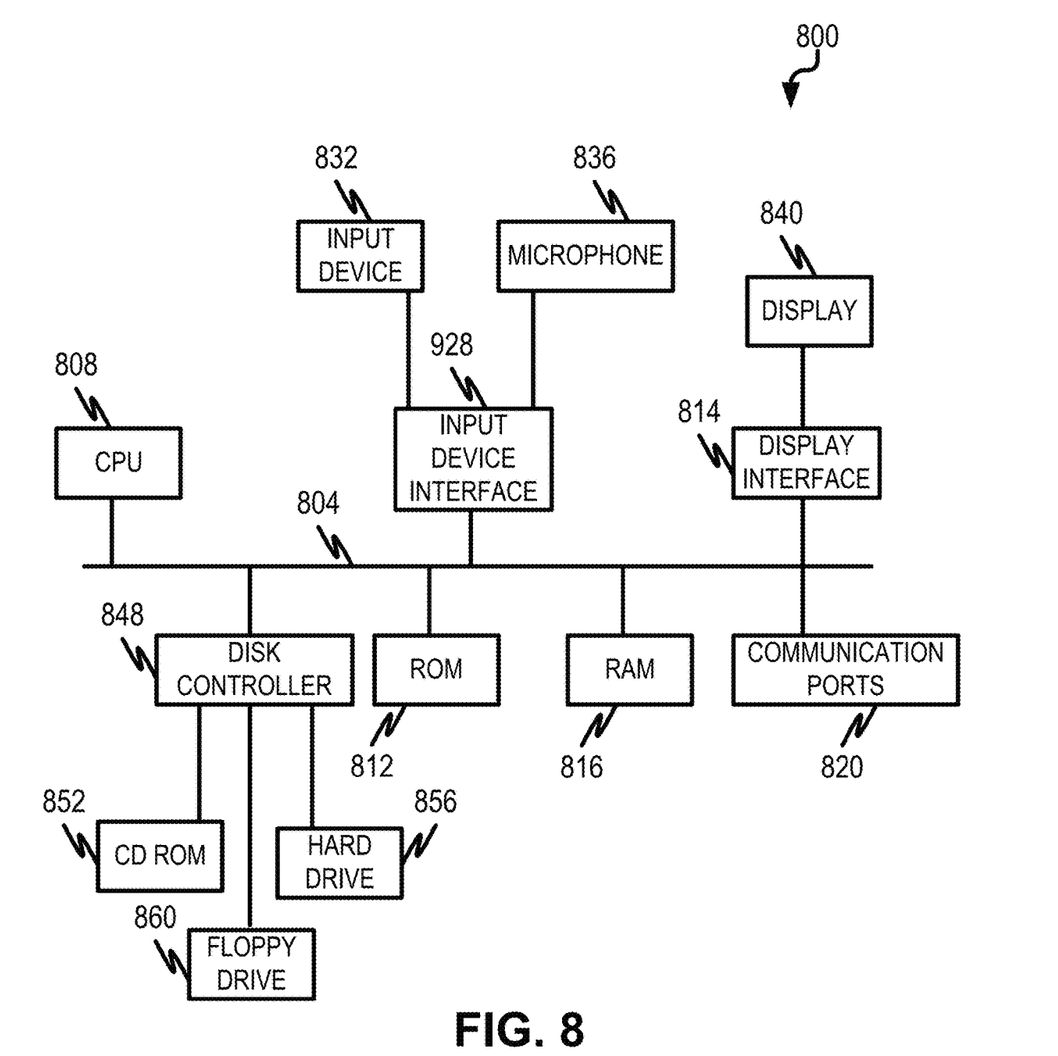
FIG. 8 is a diagram illustrating a sample computing device architecture for implementing various aspects described herein.

FIG. 8 is a diagram 800 illustrating a sample computing device architecture for implementing various aspects described herein. A bus 804 can serve as the information highway interconnecting the other illustrated components of the hardware. A processing system 808 labeled CPU (central processing unit) (e.g., one or more computer processors/data processors at a given computer or at multiple computers), can perform calculations and logic operations required to execute a program. A non-transitory processor-readable storage medium, such as read only memory (ROM) 812 and random access memory (RAM) 816, can be in communication with the processing system 808 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 848 can interface one or more optional disk drives to the system bus 804. These disk drives can be external or internal floppy disk drives such as 860, external or internal CD-ROM, CD-R, CD-RW or DVD, or solid state drives such as 852, or external or internal hard drives 856. As indicated previously, these various disk drives 852, 856, 860 and disk controllers are optional devices. The system bus 804 can also include at least one communication port 820 to allow for communication with external devices either physically connected to the computing system or available externally through a wired or wireless network. In some cases, the communication port 820 includes or otherwise comprises a network interface.

To provide for interaction with a user, the subject matter described herein can be implemented on a computing device having a display device 840 (e.g., a CRT (cathode ray tube) or LCD (liquid crystal display) monitor) for displaying information obtained from the bus 804 to the user and an input device 832 such as keyboard and/or a pointing device (e.g., a mouse or a trackball) and/or a touchscreen by which the user can provide input to the computer. Other kinds of input devices 832 can be used to provide for interaction with a user as well; for example, feedback provided to the user can be any form of sensory feedback (e.g., visual feedback, auditory feedback by way of a microphone 836, or tactile feedback); and input from the user can be received in any form, including acoustic, speech, or tactile input. In the input device 832 and the microphone 836 can be coupled to and convey information via the bus 804 by way of an input device interface 828. Other computing devices, such as dedicated servers, can omit one or more of the display 840 and display interface 814, the input device 832, the microphone 836, and input device interface 828.

To provide for interaction with a user, the subject matter described herein can be implemented on a computer having a display device (e.g., a CRT (cathode ray tube) or LCD (liquid crystal display) monitor) for displaying information to the user and a keyboard and a pointing device (e.g., a mouse or a trackball) and/or a touchscreen by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method implemented by one or more data processors forming one or more computing devices, the method comprising:
    receiving, by at least one data processor, a plurality of change requests to a graphical user interface, each change request involving a graphical user interface element forming part of the graphical userinterface;
    generating, by at least one data processor for each change request, a discrete command based on the corresponding change request;

temporarily rendering, by at least one data processor, the change requests on the graphical user interface using the discrete command to retrieve local data;
queuing the discrete commands in a command queue;
selecting the discrete command from the command queue by a command queue executor;
sending, by the command queue executor and to the at least one data processor, the discrete command to the backend for further processing in parallel with the change requests being rendered on the graphical user interface;
receiving a response to the discrete command comprising backend data from the backend and at least one status code indicating whether the discrete command was a success, a failure, or a bad request;
determining, by the at least one data processor, a delta between the local data and the backend data;
retrieving, in parallel with the temporarily rendering based on multiple discrete commands in the command queue, the backend data in response to the discrete command in the command queue; and
rendering an update to the graphical user interface based on the delta between the local data and the backend data, wherein the delta is determined based on the at least one status code, wherein the rendering of the update comprises merging the local data with the backend data when the backend data and the local data do not match.

2. The method of claim 1, wherein one of the change requests is a data query and the retrieving comprises:
determining, by at least one data processor, if temporary data in response to the data query is cached in a local data model;
providing, by at least one data processor, the data query to a backend; and
receiving, by at least one data processor, the backend data from the backend in response to the data query.

3. The method of claim 1, wherein generating the discrete command further comprises:
generating, by at least one data processor for each of the change requests, a class representing the change request; and
generating, by at least one data processor, an instance of the class for further handling by a command processor.

4. The method of claim 1, further comprising:
determining, by at least one data processor, if the backend data is responsive to the change requests;
parsing, by at least one data processor, the backend data;
determining, by at least one data processor, the existence of the delta between the backend data and the local data; and
based on the existence of the delta, rendering the update to the graphical user interface.

5. The method of claim 1, wherein the update to the graphical user interface comprises retaining the temporarily rendered change requests based on the delta between the backend data and the local data being non-existent.

6. The method of claim 1, further comprising adding or removing the discrete command to an undo stack for handling of a further change request.

7. The method of claim 6, wherein the further change request is to undo or redo a prior change request and the temporarily rendering the change requests comprises retrieving the command from the undo stack.

8. The method of claim 1, wherein at least one of the change requests is derived from user input via the graphical user interface.

9. A system comprising: at least one data processor; and memory storing instructions, which when executed by at least one data processor, result in operations comprising:
receiving a plurality of change requests to a graphical user interface, each change request involving a graphical user interface element forming part of the graphical user interface;
generating, for each change request, a discrete command based on the corresponding change request;
temporarily rendering the change requests on the graphical user interface using the discrete command to retrieve local data;
queuing the discrete commands in a command queue;
selecting the discrete command from the command queue by a command queue executor;
sending, by the command queue executor and to the at least one data processor, the discrete command to the backend for further processing in parallel with the change requests being rendered on the graphical user interface;
receiving a response to the discrete command comprising backend data from the backend and at least one status code indicating whether the discrete command was a success, a failure, or a bad request;
determining, by the at least one data processor, a delta between the local data and the backend data;
retrieving, in parallel with the temporarily rendering based on multiple discrete commands in the command queue, backend data in response to the discrete command in the command queue; and
rendering an update to the graphical user interface based on the delta between the local data and the backend data, wherein the delta is determined based on the at least one status code, wherein the rendering of the update comprises merging the local data with the backend data when the backend data and the local data do not match.

10. The system of claim 9, wherein at least one of the change requests is a data query and the retrieving comprises:
determining if temporary data in response to the data query is cached in a local data model;
providing the data query to a backend; and
receiving the backend data from the backend in response to the data query.

11. The system of claim 9, wherein generating the discrete command further comprises:
generating, for each of the change requests, a class representing the change request; and
generating an instance of the class for further handling by a command processor.

12. The method of claim 9, wherein the operations further comprise:
determining if the backend data is responsive to the change requests;
parsing the backend data;
determining the existence of the delta between the backend data and the local data; and
based on the existence of the delta, rendering the update to the graphical user interface.

13. The system of claim 9, wherein the update to the graphical user interface comprises retaining the temporarily rendered change requests based on the delta between the backend data and the local data being non-existent.

14. The system of claim 9, wherein the operations further comprise adding or removing the discrete command to an undo stack for handling of a further change request.

15. The system of claim 14, wherein the further change request is to undo or redo a prior change request and the temporarily rendering the change request§, comprises retrieving the command from the undo stack.

16. The system of claim 9, wherein at least one of the change requests is derived from user input via the graphical user interface.

17. A non-transitory computer program product storing instructions which, when executed by at least one data processor forming part of at least one computing device, result in operations comprising:

receiving a plurality of change requests to a graphical user interface, each change request involving a graphical user interface element forming part of the graphical user interface;

generating, for each change request, a discrete command based on the corresponding change request;

temporarily rendering the change requests on the graphical user interface using the discrete command to retrieve local data;

queuing the discrete commands in a command queue;

selecting the discrete command from the command queue by a command queue executor;

sending, by the command queue executor and to the at least one data processor, the discrete command to the backend for further processing in parallel with the change requests being rendered on the graphical user interface;

receiving a response to the discrete command comprising backend data from the backend and at least one status code indicating whether the discrete command was a success, a failure, or a bad request;

determining, by the at least one data processor, a delta between the local data and the backend data;

retrieving, in parallel with the temporarily rendering based on multiple discrete commands in the command queue, the backend data in response to the discrete command in the command queue; and rendering an update to the graphical user interface based on the delta between the local data and the backend data, wherein the delta is determined based on the at least one status code, wherein the rendering of the update comprises merging the local data with the backend data when the backend data and the local data do not match.

* * * * *